United States Patent
Agner et al.

(10) Patent No.: US 10,632,832 B2
(45) Date of Patent: Apr. 28, 2020

(54) HYBRID MODULE FOR A DRIVE TRAIN AND ASSEMBLY OF A HYBRID MODULE OF THIS TYPE

(71) Applicant: Schaeffler Technologies AG & Co. KG, Herzogenaurach (DE)

(72) Inventors: Ivo Agner, Bühml (DE); Aurelie Keller, Oberhoffen sur Moder (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/743,316

(22) PCT Filed: Jul. 12, 2016

(86) PCT No.: PCT/DE2016/200318
§ 371 (c)(1),
(2) Date: Jan. 10, 2018

(87) PCT Pub. No.: WO2017/008806
PCT Pub. Date: Jan. 19, 2017

(65) Prior Publication Data
US 2018/0208042 A1    Jul. 26, 2018

(30) Foreign Application Priority Data

Jul. 13, 2015  (DE) .................. 10 2015 213 101

(51) Int. Cl.
| | |
|---|---|
| *B60K 6/40* | (2007.10) |
| *B60K 6/387* | (2007.10) |
| *F16D 13/38* | (2006.01) |
| *F16D 21/06* | (2006.01) |
| *F16D 48/02* | (2006.01) |
| *B60K 6/405* | (2007.10) |

(Continued)

(52) U.S. Cl.
CPC ............... *B60K 6/387* (2013.01); *B60K 6/40* (2013.01); *B60K 6/405* (2013.01); *F16D 13/385* (2013.01);

(Continued)

(58) Field of Classification Search
CPC .......... B60K 6/387; B60K 6/405; B60K 6/40; F16D 25/14; F16D 25/0635; F16D 21/06
See application file for complete search history.

(56) References Cited

U.S. PATENT DOCUMENTS

| | | | |
|---|---|---|---|
| 6,217,476 B1 * | 4/2001 | Muller ................. | B60K 6/26 192/25 |
| 7,017,693 B2 * | 3/2006 | Omote ................. | B60K 6/26 180/65.26 |

(Continued)

FOREIGN PATENT DOCUMENTS

| | | |
|---|---|---|
| CN | 104108307 A | 10/2014 |
| DE | 102005053887 A1 | 5/2007 |

(Continued)

OTHER PUBLICATIONS

International Search Report for PCT/DE2016/200318; 3 pgs; dated Oct. 28, 2016 by European Patent Office.

*Primary Examiner* — Patrick H Mackey
(74) *Attorney, Agent, or Firm* — Reid A. Baldwin

(57) ABSTRACT

A hybrid module is provided for the drivetrain of a motor vehicle, which drivetrain has an electric machine, an internal combustion engine and a transmission. The hybrid module has (i) a first unit with a rotor element and a separating clutch which is arranged within the rotor element, (ii) a second unit with a clutch device comprising at least one clutch, and (iii) a third unit with a housing part. The first unit and the second unit are connected to each other to form a preassembled overall unit, and said overall unit is installed projecting into the third unit and is connected here to the third unit. A hybrid module constructed in such a manner can be produced by means of particularly simple assembly and is very compact. A method for assembly of said hybrid module is also provided.

15 Claims, 3 Drawing Sheets

(51) Int. Cl.
  *F16D 13/40* (2006.01)
  *F16D 13/70* (2006.01)
  *F16D 25/0635* (2006.01)

(52) U.S. Cl.
  CPC ............ *F16D 13/40* (2013.01); *F16D 13/70* (2013.01); *F16D 21/06* (2013.01); *F16D 25/14* (2013.01); *B60Y 2200/92* (2013.01); *F16D 25/0635* (2013.01); *F16D 2013/706* (2013.01); *F16D 2021/0615* (2013.01); *F16D 2021/0653* (2013.01); *F16D 2021/0669* (2013.01); *F16D 2500/1066* (2013.01); *Y10S 903/914* (2013.01)

(56) References Cited

U.S. PATENT DOCUMENTS

| | | | | |
|---|---|---|---|---|
| 7,811,190 B2* | 10/2010 | Tabata | .................... | B60K 6/26 475/5 |
| 9,051,976 B2* | 6/2015 | Kuwahara | ................ | B60K 6/40 |
| 2004/0195068 A1* | 10/2004 | Sudau | .................... | F16D 13/52 192/70.12 |
| 2006/0289209 A1* | 12/2006 | Grosspietsch | ........... | B60K 6/26 180/65.25 |
| 2008/0023287 A1* | 1/2008 | Thiede | .................... | B60K 6/26 192/48.1 |
| 2011/0162480 A1* | 7/2011 | Ruder | .................... | B60K 6/40 74/574.4 |
| 2012/0043176 A1 | 2/2012 | Arnold et al. | | |
| 2013/0088109 A1* | 4/2013 | Frait | .................... | H02K 7/006 310/90 |
| 2017/0203643 A1* | 7/2017 | Suyama | .................... | B60K 6/387 |

FOREIGN PATENT DOCUMENTS

| | | |
|---|---|---|
| DE | 102009059944 A1 | 7/2010 |
| DE | 102010003442 A1 | 10/2011 |
| DE | 102011086741 A1 | 5/2013 |
| WO | 2014026685 A1 | 2/2014 |
| WO | 2015040284 A1 | 3/2015 |

* cited by examiner

HYBRID MODULE FOR A DRIVE TRAIN AND ASSEMBLY OF A HYBRID MODULE OF THIS TYPE

CROSS-REFERENCE TO RELATED APPLICATIONS

This application is the United States National Phase of PCT Appln. No. PCT/DE2016/200318 filed Jul. 12, 2016, which claims priority to German Application No. DE102015213101.7 filed Jul. 13, 2015, the entire disclosures of which are incorporated by reference herein.

TECHNICAL FIELD

The present disclosure relates to a hybrid module for a drivetrain of a motor vehicle, which drivetrain has an electric machine, an internal combustion engine and a transmission. The present disclosure furthermore relates to a method for assembly of a hybrid module of this type.

BACKGROUND

A corresponding hybrid module is known from WO 2014/026685 A1. This document presents a hybrid module for a drivetrain of a motor vehicle, in which an electric machine designed as an internal rotor is arranged between an internal combustion engine and a transmission. The hybrid module comprises (i) an overall unit with a rotor of the electric machine, a separating clutch arranged within the rotor and at least one clutch cover of a clutch device, said clutch cover being connected to the rotor for rotation therewith, and (ii) a housing part at least partially accommodating the overall unit and a stator of the electric machine.

BRIEF SUMMARY

The disclosure specifies a hybrid module which can be constructed simply and is compact and has components for transmitting torque to at least one transmission input shaft, and a method for assembly of said hybrid module.

In the case of the hybrid module for a drivetrain of a motor vehicle, which drivetrain has an electric machine, an internal combustion engine and a transmission, it is provided that the hybrid module has (i) a first unit with a rotor element and a separating clutch which is arranged within the rotor element, (ii) a second unit with a clutch device comprising at least one clutch, and (iii) a third unit with a housing part. The first unit and the second unit are connected to each other to form a preassembled overall unit, and said overall unit is installed projecting into the third unit and is connected here to the third unit. A hybrid module constructed in such a manner can be produced by means of particularly simple assembly and is very compact.

It is provided that the third unit furthermore also has the electric machine or at least a stator of the electric machine. The result thereof in particular is that the electric machine is arranged between the internal combustion engine and the transmission in the drivetrain.

According to an embodiment of the invention, it is provided that the function of the second unit and/or of at least two units of the first, second and third unit in the hybrid module can be checked individually prior to installation. The corresponding tests can therefore already take place or be finished prior to the (final) assembly.

According to a further embodiment, it is provided that the connection between first and second unit is designed as a screw connection and/or riveted connection and/or welded connection.

In an embodiment, the connection between first and second unit is realized by a connection between the rotor element, on the one hand, and a counterplate of the clutch device or at least one intermediate element connected to such a counterplate, on the other hand. In a variant embodiment, the counterplate and a pressure plate are supported axially on the intermediate element and/or the rotor element.

According to a further embodiment, the connection of the preassembled overall unit to the third unit is realized by a screw connection or another releasable connection.

According to a further embodiment, the connection of the preassembled overall unit to the third unit is designed as a connection which can be manipulated on the engine side.

According to yet another embodiment, the rotor element is designed either as a rotor of the electric machine, or as a rotor element which can be driven by the electric machine, in particular a roller which can be driven via a belt drive. In the first of these two cases, the third unit generally has the stator of the electric machine. In the second of said two cases, the electric machine is generally arranged on/in the third unit.

Furthermore, it is advantageously provided that the rotor element, the separating clutch and the clutch device connected to the rotor element are mounted jointly via a bearing unit.

According to an embodiment, it is provided that the connection between rotor and clutch device for conjoint rotation is realized as a direct or indirect connection between a rotor lamination of the rotor and a counterplate of the clutch device.

According to an embodiment, it is provided that the central bearing unit is fastened to the third unit by means of a screw connection or another releasable connection. It is in particular provided here that the releasable connection is a releasable connection which can be manipulated on the engine side.

According to a further embodiment, the hybrid module has an engine-side intermediate wall. Said intermediate wall is preferably formed partially by the first unit and partially by the third unit.

In general, the clutch device can be designed as a single clutch or as a multiple clutch. According to yet another embodiment, the clutch device is designed as a dual clutch. The solid shaft of the dual clutch, i.e. the K1 transmission input shaft, is mounted in a shaft which is driven by an internal combustion engine, the intermediate shaft of the hybrid module. The actuating elements of the dual clutch are brought into contact with the engagement bearings which are preassembled on the transmission side.

In an embodiment, the separating clutch is designed as a hydraulically actuable clutch. For this purpose, for example, a corresponding disengagement device is provided.

The hybrid module has a disengagement device designed as a concentric slave cylinder (CSC) for actuating the separating clutch by means of a pressure pot. The K0 clutch can be hydraulically actuated via a CSC with short pistons. In this way, by means of a tilting degree of freedom, oblique positions of the actuating system of the K0 can be compensated for.

The separating clutch itself can be actuated by means of a pressure pot without an additional lever ratio. Owing to the low level of hysteresis as a result of the direct actuation, the clutch can then be regulated in terms of pressure. CSC and engagement bearings are preferably nested radially.

In an embodiment, it is provided that the hybrid module furthermore has a dual mass flywheel which is connected upstream of the separating clutch in the drivetrain.

Compensation for the offset of the entire unit radially with respect to the transmission is undertaken via the frictional contact of the clutch disks. Axial tolerances can be compensated for by means of variation of the axial paths in the engagement system.

Irrespective of the configuration of the dual clutch, the K0 clutch, i.e. the rotor-integrated separating clutch of the hybrid module, can have the following further features:

It is provided that axial and radial forces are absorbed by the central bearing unit (the rotor mounting); the latter has corresponding bearings for this purpose.

The connection of the first counterplate of the dual clutch to the rotor can be undertaken via a thin plate (preferably welded to the rotor element or produced integrally by means of a forming process). Said plate can be screwed, riveted or welded directly onto said first counterplate.

The connection of the first counterplate to the rotor element can also be undertaken by means of direct welding. The counterplate is preferably also simultaneously the counterplate of the K0 (dual function). This saves on axial construction space and parts.

In the case of the method for assembly of a hybrid module for a drivetrain of a motor vehicle, which drivetrain has an electric machine, an internal combustion engine and a transmission, it is provided that the hybrid module has (i) a first unit with a rotor element and a separating clutch which is arranged within the rotor element, (ii) a second unit with a clutch device comprising at least one clutch, and (iii) a third unit with a housing part. The first unit and the second unit are first of all connected to each other to form a preassembled overall unit, and said overall unit is subsequently installed projecting into the third unit and is connected here to the third unit. In particular, it is furthermore provided that the third unit also has the electric machine or at least a stator of the electric machine.

According to an embodiment, it is provided that the hybrid module is subsequently inserted into a housing part of the transmission and is fastened there—in particular by screwing the third unit to said housing part.

BRIEF DESCRIPTION OF THE DRAWINGS

Embodiments of the disclosure, to which this disclosure is however not restricted and from which further features according to the disclosure can emerge, are shown in the following figures.

In the figures.

DETAILED DESCRIPTION

Figure 1:
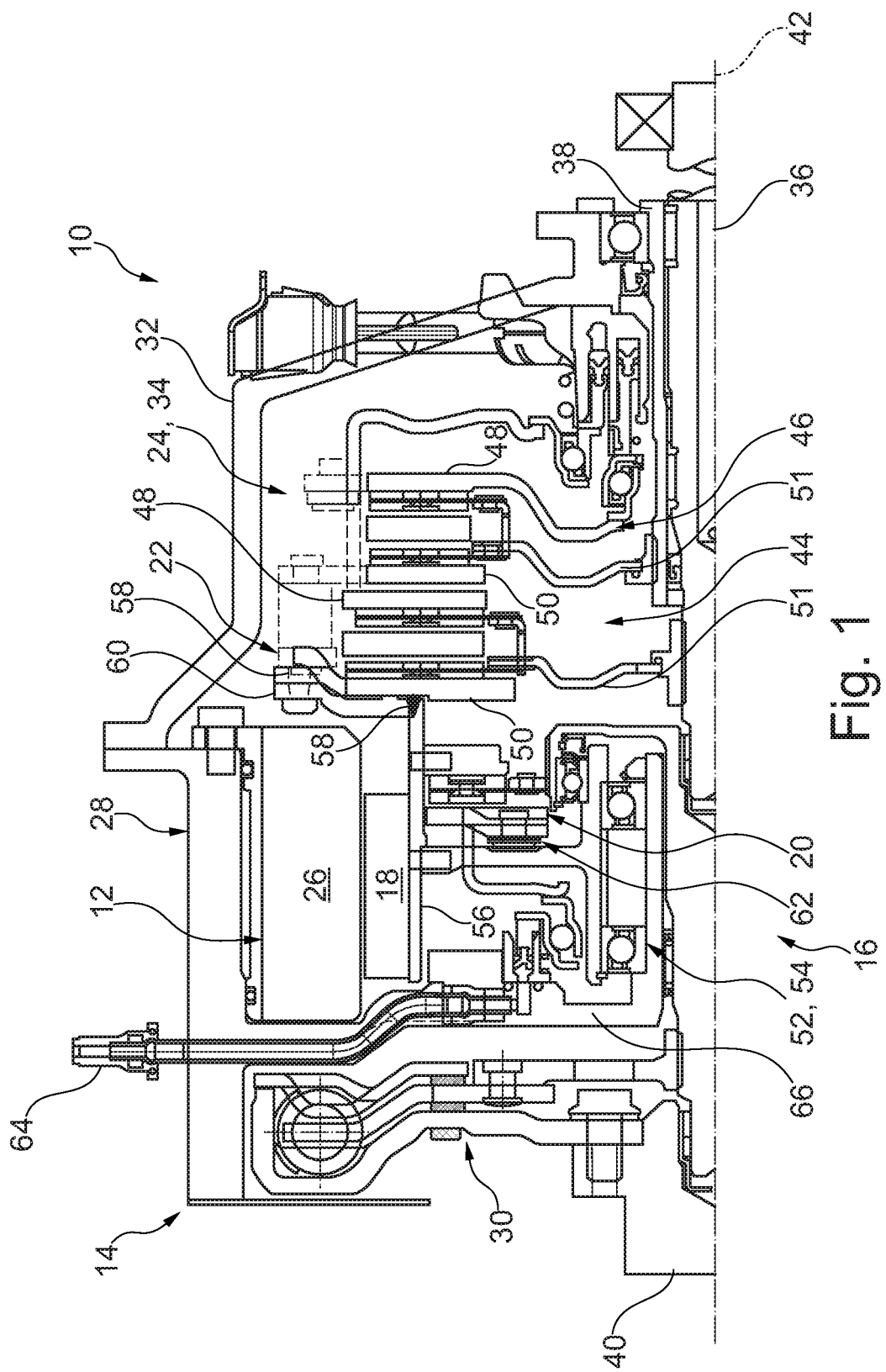
FIG. 1 shows a hybrid module according to a first embodiment of the disclosure.

FIG. 1 shows a part of a drivetrain 10 of a motor vehicle in a sectional illustration. In the drivetrain 10, an electric machine 12 is arranged between an internal combustion engine (not shown) and a transmission (likewise not shown). The electric machine 12 serves as a drive machine and is part of a hybrid module 14. Said hybrid module 14 has the following main components: (i) a first unit 16 with a rotor element 18 designed as a rotor of the electric machine 12, with a K0 separating clutch 20 arranged within the rotor element 18, and with at least one second unit 22 which is connected to the rotor element 18 for rotation therewith and has a clutch device 24, (ii) a third unit (housing unit) 28 partially accommodating the first unit 16 and a stator 26 of the electric machine 12, (iii) a dual mass flywheel 30 which is connected upstream of the separating clutch 20 in the drivetrain 10, and (iv) a housing part 32, which accommodates the clutch device 24, of the transmission. The clutch device 24 is designed as a dual clutch 34. Accordingly, the transmission is designed as a dual clutch transmission, of which only the two transmission input shafts 36, 38 are illustrated.

The following path of the drivetrain is realized: Output shaft 40 of the internal combustion engine—dual mass flywheel 30—K0 separating clutch 20—rotor element 18 as rotor—clutch device 24—transmission input shaft 36, 38. The corresponding shafts 36, 38, 40 lie here on a common axis 42, which forms the main axis of the hybrid module 14.

The clutch device 24 which is designed as a dual clutch 34 has two clutches 44, 46 with corresponding pressure plates 48, counterplates 50, clutch disks 51 and actuating devices.

The rotor element 18 which is designed as a rotor has, in its interior, a rotor bearing arrangement 52 which serves as a central bearing unit 54 via which the entire first unit 16 is mounted rotatably in the third unit 28. In this example, the connection between rotor element 18 and second unit 22 for conjoint rotation is realized as an indirect connection between a rotor lamination 56 of the rotor 18 and the counterplates 50 of the clutch device 24 via intermediate elements 60.

The separating clutch 20 is designed as a hydraulically actuable clutch and is actuated by means of a disengagement device 62, which is designed as a concentric slave cylinder, by means of a pressure pot via a pressure connection 64.

On the engine side, an intermediate wall 66 is arranged between electric machine 12 and dual mass flywheel 30. Said intermediate wall is formed partially by the first unit 16 and partially by the third unit 28 by means of a screw connection 68.

The second unit 22 with the clutch device 24, i.e. in particular with the dual clutch 34 illustrated, is screwed, riveted or welded, in a manner separable for servicing, to the first unit 16, which, in addition to the rotor element 18, contains the separating clutch K0 20 and the shaft driven by the internal combustion engine, to form a preassembled overall unit 16, 22. For a simple connection, it can be advantageous to connect the rotor element 18 to the clutch device 24 via an additional plate. In the case of a screw connection, separation can take place directly, in the case of a riveted connection the rivets merely have to be drilled out and reassembly is easily possible using new rivets. Welding is also possible, but the overall unit then can no longer be removed without being cut open. The stator 26 of the electric machine (E motor) 12 can be arranged coaxially around the rotor 18. Alternatively, however, a replacement at the assembly position of the rotor 18 could also be a rotor element which is designed as a pulley, chain pinion, gearwheel, etc., via which the torque of an electric machine 12 arranged axially parallel can be introduced into the transmission (assembly step MS1).

The resulting overall unit 16, 22 is completely fitted into the preassembled third unit 28 and is preferably screwed to the latter (assembly step MS2).

This entire unit in turn is fitted into the transmission housing. In the process, the clutch disks 51 are pushed onto the transmission input shaft(s) 36, 38, the solid shaft is mounted in the shaft driven by the internal combustion engine, and the actuating elements of the dual clutch 34 are brought into contact with the engagement bearings, which are preassembled on the transmission side (assembly step MS3). Furthermore, the following resulting advantages are realized:

A separate mounting of the clutch device 24 (dual clutch 34) in the transmission is not necessary since the actuating forces are supported by the rotor mounting 52 of the rotor 18 and therefore the clutch device 24 (dual clutch 34) is also mounted axially and radially.

The radial compensation of the offset between entire unit 16, 22, 28 and transmission is undertaken via the frictional contact of the clutch disks 51. Axial tolerances can be compensated for by varying the axial paths in the engagement system.

Figure 2:
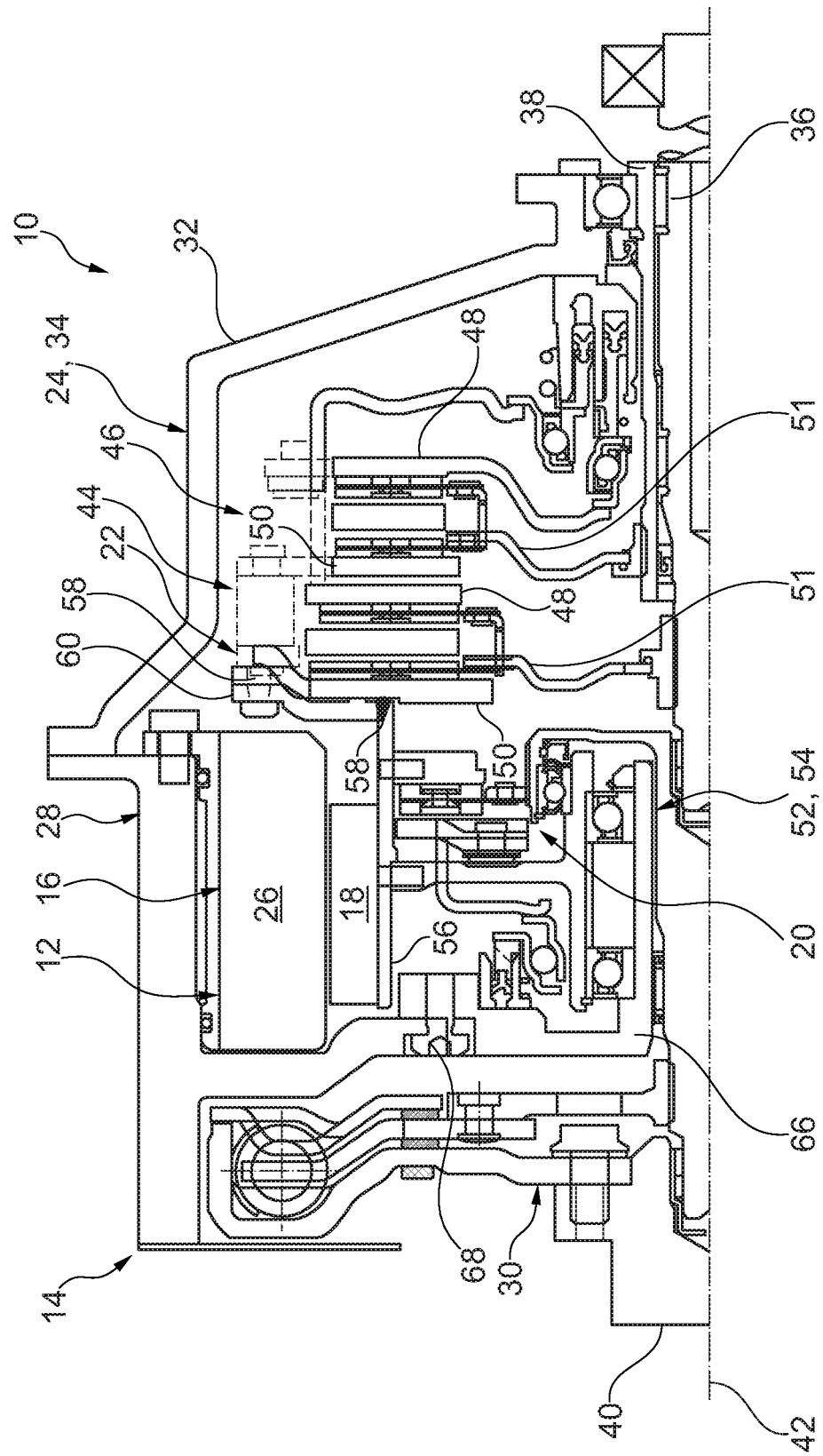
FIG. 2 shows a different illustration of the hybrid module shown in FIG. 1.

FIG. 2 shows another (sectional) illustration of the hybrid module 14 shown in FIG. 1. It can be seen in this illustration that the engine-side intermediate wall 66 is formed partially by the first unit 16 and partially by the third unit 28 by means of a screw connection 68 of corresponding parts.

Figure 3:
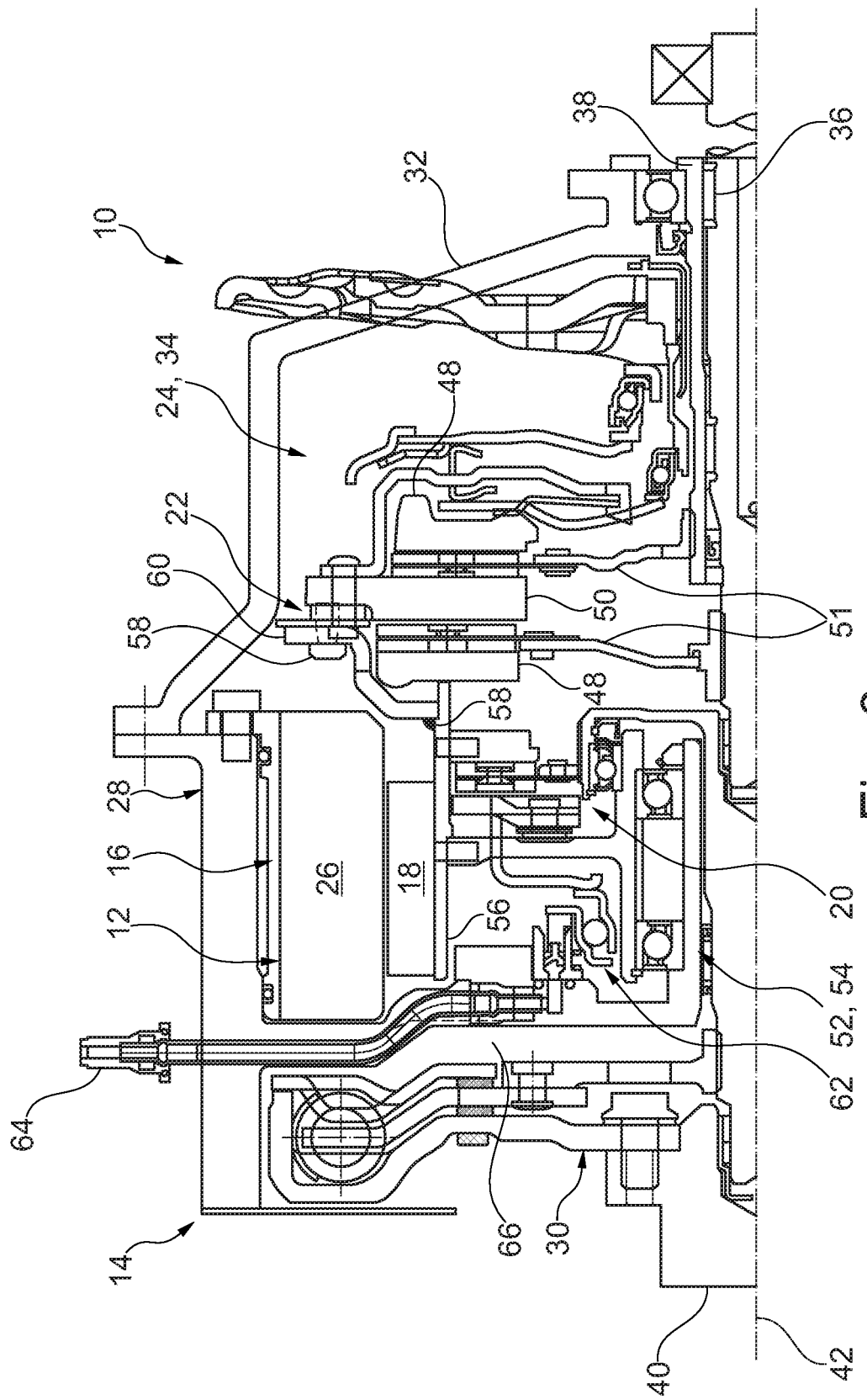
FIG. 3 shows a hybrid module according to a second embodiment of the disclosure.

FIG. 3 shows another embodiment of the hybrid module 14. This embodiment substantially corresponds to the embodiment of the hybrid module 14 from FIGS. 1 and 2, and therefore only the differences will be discussed here. In this hybrid module 14 which is depicted in FIG. 3, the dual clutch 34 is designed as a 3-plate dual clutch.

When the clutch device 24 is mounted in the hybrid module 14, axial and radial forces are absorbed by the rotor mounting 52.

The rotor element 18 forms the axial end stop of the pressure plate 48 which is actuated by a tie rod and is spaced apart with leaf springs in the open state of the clutch device 24.

The central plate acting as the counterplate 50 is connected to the rotor 18 via a thin plate (preferably welded to the rotor element 18 or produced integrally by a forming process), wherein the plate is screwed, riveted (or welded, in which case is nonremovable) to the central plate directly or via a sheet-metal intermediate part.

The assembly of the overall unit 18, 22, 28 and of the transmission is also carried out here by (i) fastening the rotor element 18 (of the first unit 16) to the clutch device 24 (of the second unit 22), (ii) inserting the preassembled overall unit 16, 22 obtained in this manner into the previously fitted third unit 28, which accommodates the electric machine 12, and fastening the preassembled overall unit 16, 22 to the third unit 28, and by (iii) inserting an overall unit obtained in such a manner into a housing of the transmission.

LIST OF REFERENCE NUMBERS

10 Drivetrain
12 Machine, electric
14 Hybrid module
16 Unit, first
18 Rotor element
20 Separating clutch, K0
22 Unit, second
24 Clutch device
26 Stator, electric machine
28 Unit, third
30 Dual mass flywheel
32 Housing part (transmission)
34 Dual clutch
36 Transmission input shaft, first
38 Transmission input shaft, second
40 Output shaft
42 Axis
44 Clutch, first
46 Clutch, second
48 Pressure plate
50 Counterplate
51 Clutch disk
52 Rotor mounting
54 Bearing unit, central (module unit)
56 Rotor lamination
58 Connection
60 Intermediate element
62 Disengagement element
64 Pressure connection
66 Intermediate wall
68 Screw connection

The invention claimed is:

1. A hybrid module comprising:
a first unit including a rotor element and a separating clutch arranged within the rotor element;
a second unit including a clutch device comprising at least one clutch; and,
a third unit including a housing part, wherein:
the first unit and the second unit are connected to each other to form a preassembled overall unit;
the first unit further comprises a rotor bearing arrangement arranged within the rotor element, and an actuating force of the clutch device is supported by the rotor bearing arrangement;
the preassembled overall unit is connected to the third unit and the preassembled overall unit projects into the third unit; and,
the clutch device includes a counter plate and the rotor element is connected to the counter plate; or
the clutch device includes a counter plate and an intermediate element connected to the counter plate, and the rotor element is connected to the intermediate element.

2. The hybrid module of claim 1, wherein a function of the second unit can be checked individually prior to installation.

3. The hybrid module of claim 1, wherein a function of at least two of the first unit, the second unit and the third unit can be checked individually prior to installation.

4. The hybrid module of claim 1, wherein the first unit and the second unit are connected by a fastener.

5. The hybrid module of claim 4, wherein the fastener is a bolt or a rivet.

6. The hybrid module of claim 1, wherein the first unit and the second unit are connected by welding.

7. The hybrid module of claim 1, wherein the overall unit is connected to the third unit by a releasable connection.

8. The hybrid module of claim 7 wherein the releasable connection is a screw connection.

9. The hybrid module of claim 1, wherein a connection of the preassembled overall unit to the third unit is arranged to be manipulated on an engine side of the hybrid module.

10. The hybrid module of claim 1 wherein the rotor element is a rotor element of an electric machine or a roller arranged for driving connection with an electric machine via a belt drive.

11. The hybrid module of claim 1 wherein the rotor element, the separating clutch and the clutch device are mounted jointly via a bearing unit.

12. A drivetrain of a motor vehicle comprising:
an electric machine;
an internal combustion engine;
a transmission; and,
the hybrid module of claim 1.

13. A method for assembly of a hybrid module for a drivetrain of a motor vehicle comprising:
providing a first unit with a rotor element and a separating clutch arranged within the rotor element;
providing a second unit with a clutch device comprising at least one clutch;
providing a third unit with a housing part;
connecting the first unit to the second unit to form a preassembled overall unit; and,
installing the preassembled overall unit into the third unit such that the preassembled overall unit projects into the third unit and is connected to the third unit, wherein:
the first unit further comprises a rotor bearing arrangement arranged within the rotor element, and an actuating force of the clutch device is supported by the rotor bearing arrangement;
the clutch device includes a counter plate and connecting the first unit to the second unit includes connecting the rotor element to the counter plate; or
the clutch device includes a counter plate and an intermediate element connected to the counter plate, and connecting the first unit to the second unit includes connecting the rotor element to the intermediate element.

14. The method of claim 13, further comprising:
providing a drivetrain with an electric machine, an internal combustion engine, and a transmission with a housing;
inserting the hybrid module into the housing; and,
fastening the third unit to the housing.

15. The method of claim 14 wherein the third unit is fastened to the housing by screwing.

* * * * *